(12) United States Patent
Lim et al.

(10) Patent No.: US 8,056,438 B2
(45) Date of Patent: Nov. 15, 2011

(54) BICYCLE SHIFT CONTROL DEVICE

(75) Inventors: Chan Jin Lim, Pekan Nanas (MY); Seng Loong Ng, Kluanh (MY); Mohd Arif Husin, Arau (MY)

(73) Assignee: Shimano Components (Malaysia) SDN. BHD., Johor (MY)

( * ) Notice: Subject to any disclaimer, the term of this patent is extended or adjusted under 35 U.S.C. 154(b) by 1038 days.

(21) Appl. No.: 11/600,190

(22) Filed: Nov. 16, 2006

(65) Prior Publication Data

US 2008/0115615 A1 May 22, 2008

(51) Int. Cl.
*F16C 1/10* (2006.01)
*F16H 63/42* (2006.01)

(52) U.S. Cl. ............... 74/502.2; 74/489; 116/28.1

(58) Field of Classification Search ............ 74/502.2, 74/488, 489, 506, 501.6; 116/28.1, 284, 116/305
See application file for complete search history.

(56) References Cited

U.S. PATENT DOCUMENTS

| | | | |
|---|---|---|---|
| 3,524,979 A | 8/1970 | Cohen | |
| 5,178,033 A | 1/1993 | Kund | |
| 5,458,018 A | 10/1995 | Kawakami | |
| 5,601,001 A * | 2/1997 | Kawakami et al. | 74/502.2 |
| 5,632,226 A | 5/1997 | Huang et al. | |
| 5,701,786 A | 12/1997 | Kawakami | |
| 5,823,058 A * | 10/1998 | Arbeiter | 74/489 |
| 6,199,446 B1 | 3/2001 | Ose | |
| 6,265,967 B1 | 7/2001 | Okada | |
| 6,295,888 B1 | 10/2001 | Watarai | |
| 6,332,373 B1 | 12/2001 | Iteya et al. | |
| 6,389,925 B1 | 5/2002 | Ose | |
| 6,453,766 B1 | 9/2002 | Ose | |
| 6,565,466 B2 * | 5/2003 | Liu et al. | 474/80 |
| 6,681,652 B2 * | 1/2004 | Auer et al. | 74/501.6 |
| 6,694,840 B2 * | 2/2004 | Kawakami | 74/502.2 |
| 6,792,825 B2 | 9/2004 | Kawakami | |
| 6,810,764 B2 * | 11/2004 | Chen | 74/502.2 |
| 7,000,496 B2 | 2/2006 | Wessel et al. | |
| 7,117,762 B2 * | 10/2006 | Florczyk et al. | 74/501.6 |
| 7,281,489 B2 * | 10/2007 | Kawakami | 116/28.1 |
| 2002/0124678 A1 * | 9/2002 | Chen | 74/502.2 |
| 2005/0172752 A1 | 8/2005 | Florczyk et al. | |
| 2007/0245847 A1 * | 10/2007 | Chen | 74/502.2 |

FOREIGN PATENT DOCUMENTS

| DE | 196 42 907 A1 | 4/1997 |
|---|---|---|
| DE | 100 01 084 A1 | 7/2001 |

* cited by examiner

*Primary Examiner* — Vinh T. Luong
(74) *Attorney, Agent, or Firm* — Global IP Counselors, LLP

(57) ABSTRACT

A bicycle shift control device includes a housing, at least one operating lever, a rotatable member, a flexible elongated member, and a gear indicator portion having a window. The rotatable member has a guide member and is disposed within the housing. The rotatable member is configured to rotate in response to movement of the at least one operating lever. The flexible elongated member has a first end portion and a second end portion. The first end portion is connected to the rotatable member for movement therewith and extends at least partway along the guide portion of the rotatable member. The second end portion is configured for movement along the gear indicator portion with at least a tip of the second end portion of the flexible elongated member being visible through the window of the gear indicator portion.

18 Claims, 10 Drawing Sheets

BICYCLE SHIFT CONTROL DEVICE

BACKGROUND OF THE INVENTION

1. Field of the Invention

This invention generally relates to a bicycle shift control device. More specifically, the present invention relates to bicycle shift control device that includes a gear indicator portion.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle shift control device and gear indicator mechanisms (gear indicator portions).

In recent years, many bicycle shift control devices have included a gear indicator portion providing a cyclist with an indication of the current status of the gears. Specifically, an indicator informs the cyclist of the orientation of the chain relative to the chain rings or sprockets of the front and rear sprockets sets.

Many such gear indicator portions are separate units mounted to the handlebar of the bicycle connected to the bicycle shift control device by a cable or cables. Such configurations can be unattractive. Specifically, too much is mounted to the handlebar of the bicycle. Other configurations include a pin indicator or rotary device built into the bicycle shift control device. Such devices can be complex making them difficult to manufacture and difficult to adjust.

In view of the above, it will be apparent to those skilled in the art from this disclosure that there exists a need for an improved bicycle shift control device that includes a simple gear indicator portion. This invention addresses this need in the art as well as other needs, which will become apparent to those skilled in the art from this disclosure.

SUMMARY OF THE INVENTION

One object of the present invention is to provide a simple gear indicator portion within the housing of a bicycle shift control device.

Another object of the present invention is to provide an attractive gear indicator portion that is easy to read and is simple to manufacture.

The foregoing objects can basically be attained by providing bicycle shift control device with a housing, at least one operating lever, a rotatable member, a flexible elongated member and a gear indicator portion having a window. The rotatable member has a guide member and is disposed within the housing. The rotatable member is configured to rotate in response to movement of the at least one operating lever. The flexible elongated member has a first end portion and a second end portion. The first end portion is connected to the rotatable member for movement therewith and extends at least partway along the guide portion of the rotatable member. The second end portion is configured for movement along the gear indicator portion with at least a tip of the second end portion of the flexible elongated member being visible through the window of the gear indicator portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
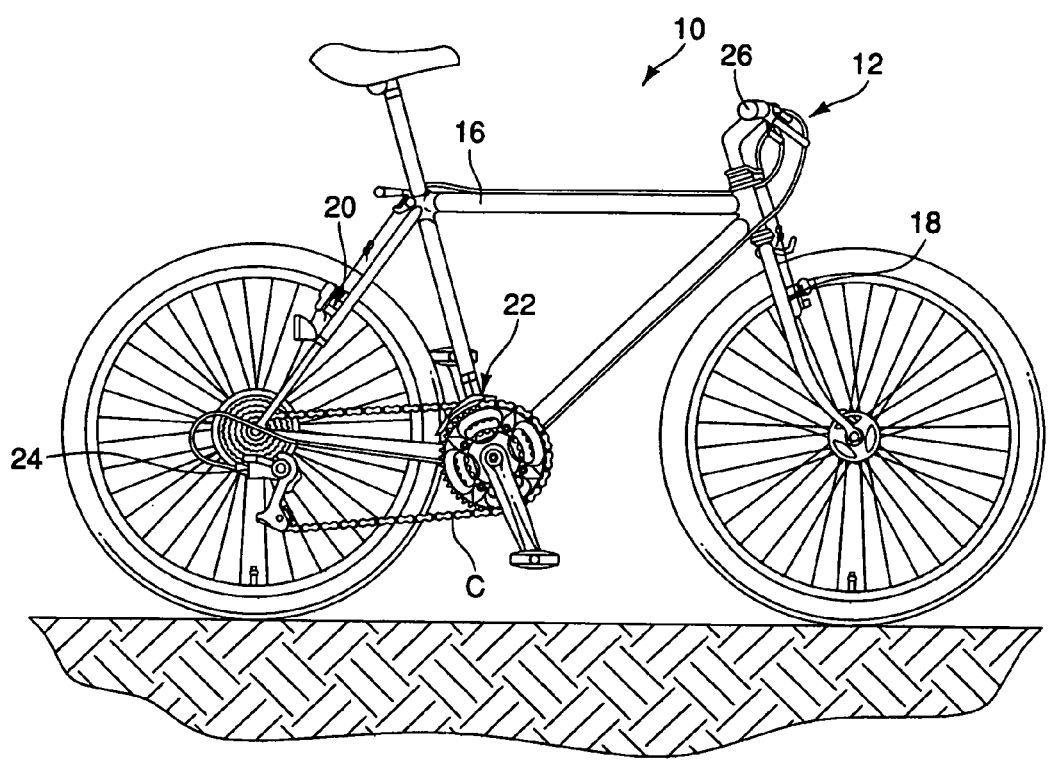
FIG. 1 is a side elevational view of a bicycle having a shift control device in accordance with the present invention.
Figure 2:
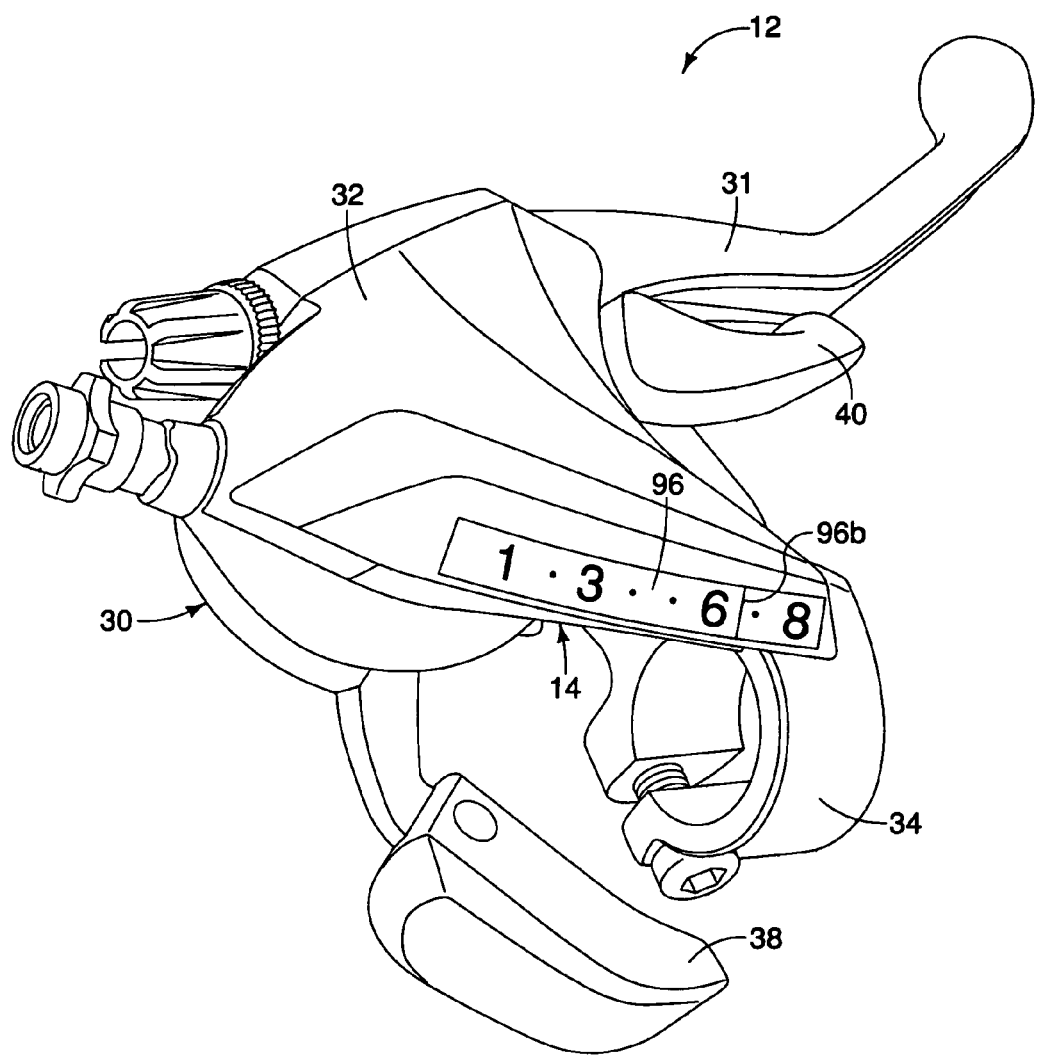
FIG. 2 is a perspective view of the shift control device having a gear indicator portion, shown removed from the bicycle in accordance with a first embodiment of the present invention.
Figure 3:
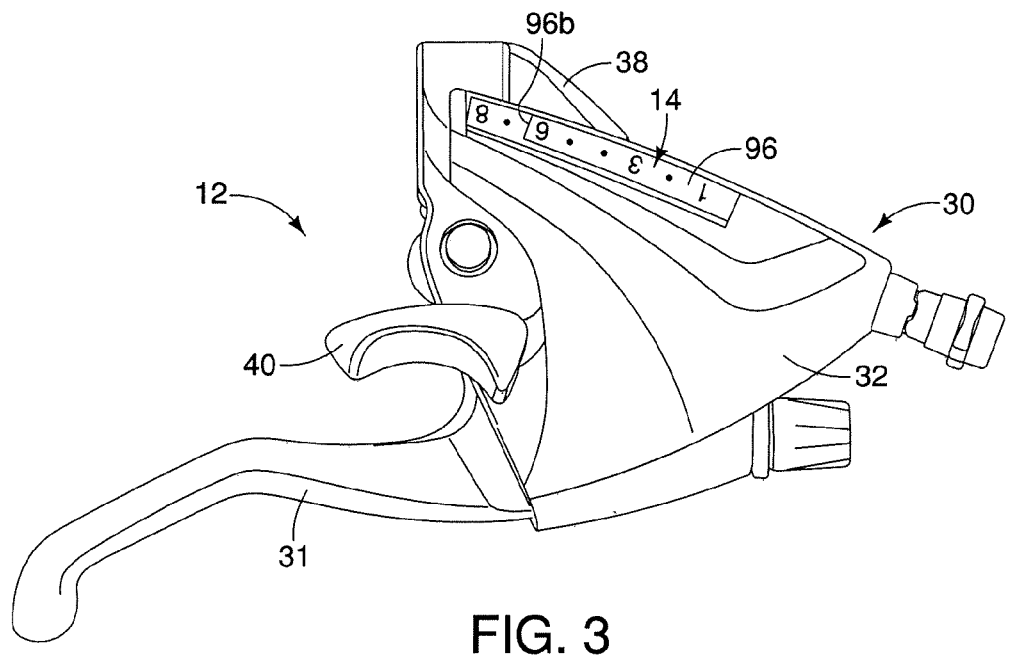
FIG. 3 is a top view of the shift control device showing a portion of the gear indicator portion in accordance with the first embodiment of the present invention.

Referring initially to FIG. 1, a bicycle 10 that includes a shift control device 12 is illustrated in accordance with a first embodiment of the present invention. The shift control device 12 is shown removed from the bicycle 10 in FIG. 2. As indicated in FIG. 2, the shift control device 12 includes a gear indicator portion 14 described in greater detail below.

The bicycle 10 includes a variety of conventional components, such as a frame 16, a front brake mechanism 18, a rear brake mechanism 20, a front derailleur 22, a rear derailleur 24, a chain C and a handlebar 26.

In a preferred embodiment of the invention, two of the shift control devices 12 are installed on the handlebar 26 of the bicycle 10. A first of the two shift control devices 12 includes controls for operating the front brake mechanism 18 and one of either the front derailleur 22 or the rear derailleur 24. A second of the two shift control devices 12 includes controls for operating the rear brake mechanism 18 and the other of the front derailleur 22 or the rear derailleur 24. The two shift control devices 12 are generally operably identical, except that they are mirror images of one another, one installed at the left side of the handlebar 26 and one installed at the right side of the handlebar 26. Since the two shift control devices 12 operate in the same manner and have the same components, description of only one of the shift control devices 12 is provided below for the sake of brevity.

With reference to FIGS. 2-5, a general description of the shift control device 12 is now provided. The shift control device 12 includes a housing 30, a brake actuation lever 31, an upper cover 32, a handlebar attachment portion 34 that is integrally formed with the housing 30, a lower cover 36 (FIG. 5), an cable-pull lever 38, a cable-release lever 40, a shifting mechanism 42 and the gear indicator portion 14.

Figure 7:
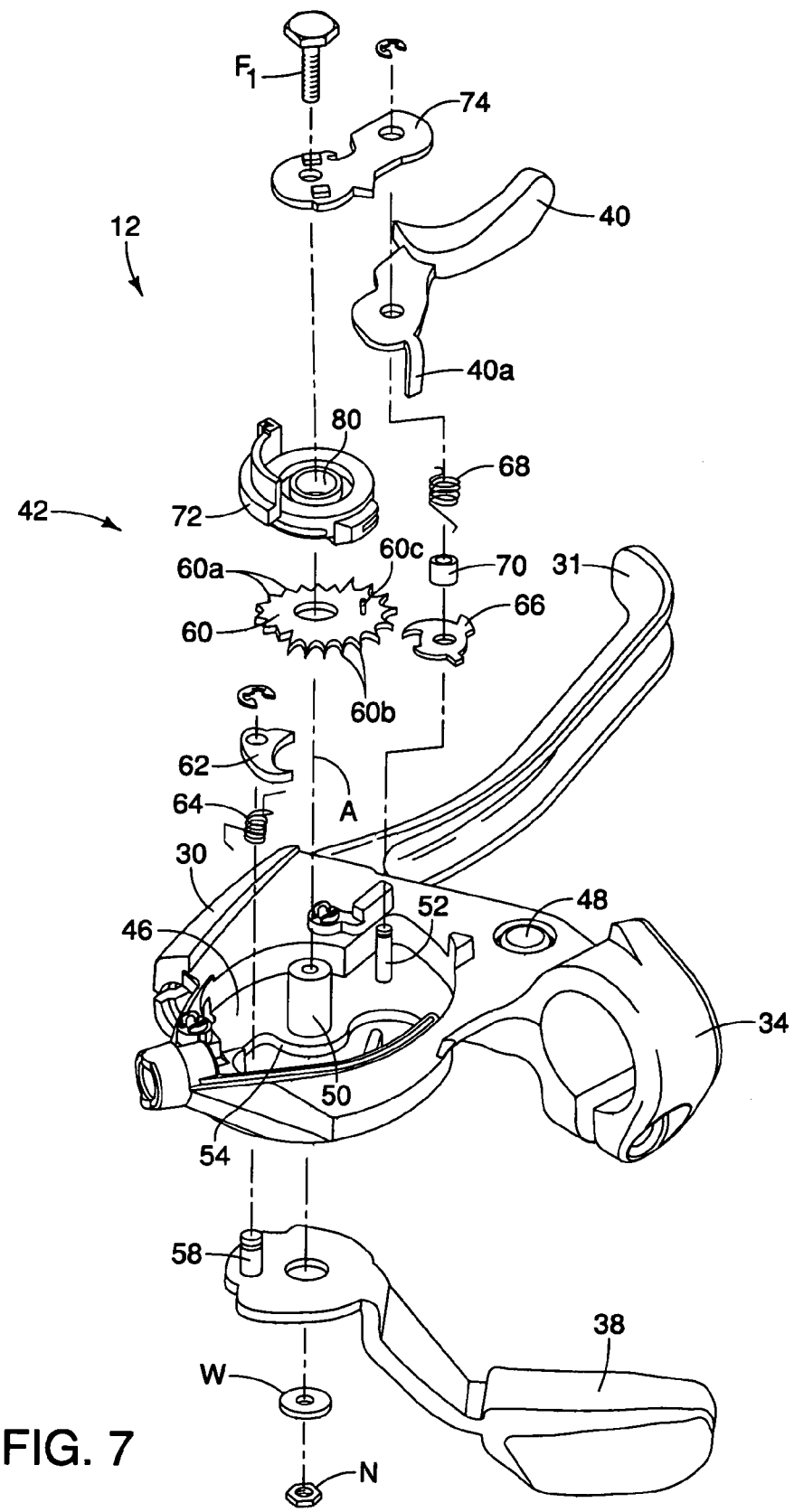
FIG. 7 is another exploded perspective view of the shift control device with portions of the gear indicator portion removed showing features of the housing, the cable-pull lever, the cable-release lever and portions of the shifting mechanism and in accordance with the first embodiment of the present invention.

As best shown in FIG. 7, the housing 30 includes, among other things, a recess 46, a brake lever pivot pin 48, a main shaft 50, a secondary shaft 52 and an opening 54. The housing 30 can be made of a metallic material, plastic or polymer material. The main shaft 50 and the secondary shaft 52 are preferably made of metal but can alternatively be made of a hard rigid plastic or polymer material.

The recess 46 is shaped and dimensioned to receive the various portions of the shifting mechanism 42, as described in greater detail below. The brake lever pivot pin 48 supports and retains the brake actuation lever 31 to the housing 30 in a conventional manner. The brake lever pivot pin 48 allows the brake actuation lever 31 to pivot in a conventional manner in order to provide brake actuation control in a conventional manner. The main shaft 50 can be fixed within the recess 46 to the housing 30 or can be removable, depending upon a variety of design and manufacturing consideration, such as ease of assembly and manufacturing techniques. The main shaft 50 includes a threaded hollow interior such that a Fastener $F_1$ (FIG. 5) can be installed therein, as described below. The secondary shaft 52 has a smaller diameter than the main shaft 50 and is dimensioned to support the cable-release lever 40, as described in greater detail below. The opening 54 extends from a lower surface (not shown) of the housing 30 to the recess 46.

The upper cover 32 includes a portion of the gear indicator portion 14. Specifically, the upper cover 32 includes a window that conforms to an elongated lens 56. The elongated lens 56 is rectangular in shape and extends along the side of the upper cover 32, as described in greater detail below. The lower cover 36 attaches to the lower side of the housing 30. The lower cover 36 includes a side wall that includes a gap G. The cable-pull lever 38 extends through the gap G such that the cable-pull lever 38 can pivot with respect to the main shaft 50.

As shown in FIG. 7, the cable-pull lever 38 includes a pivot shaft 58. The cable-pull lever 38 is supported for pivotal movement on a lower end (not shown) of the main shaft 50 and is held in place by a washer W and nut N that threads to the lower end of the fastener F1. The cable-pull lever 38 is operably coupled to the shifting mechanism 42, as described below. The cable-release lever 40 is supported on the secondary shaft 52 and is also operably coupled to the shifter mechanism 42 as described below. The cable-release lever 40 includes an extension 40a that extends downward into the recess 46 with the cable-release lever 40 installed on the secondary shaft 52.

Figure 8:
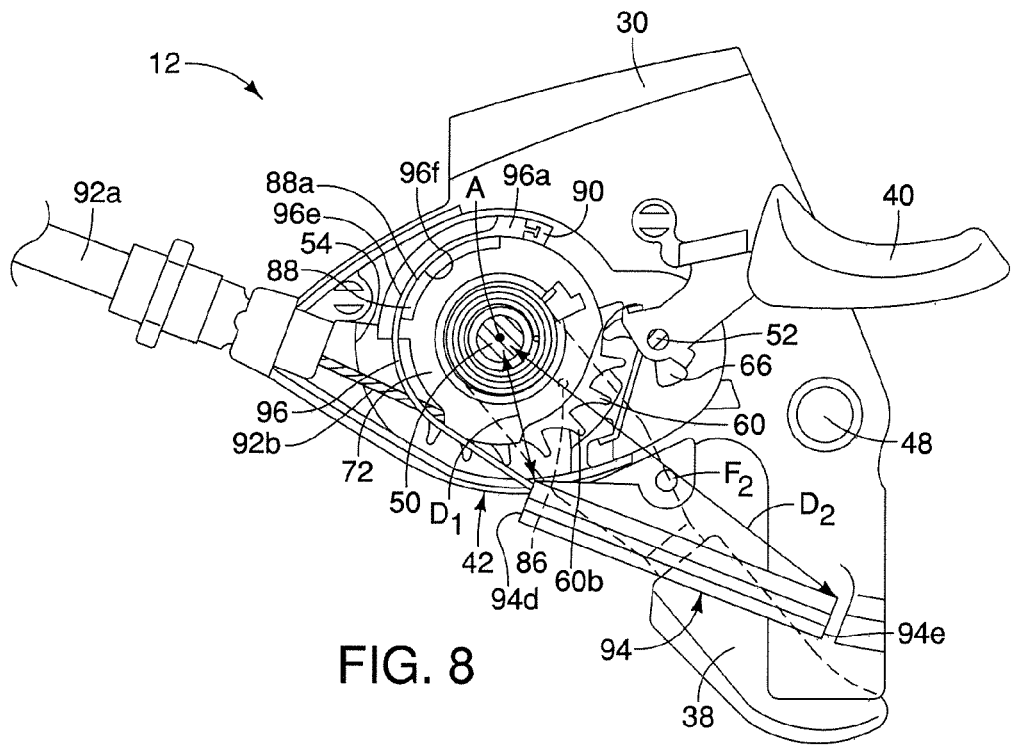
FIG. 8 is a part cross-sectional top view of the shift control device taken along the line 8-8 in FIG. 4 showing the housing, the cable-pull lever, portions of the cable-release lever, portions of the shifting mechanism and components of the gear indicator portion in accordance with the first embodiment of the present invention.

With reference to FIGS. 7 and 8, a description of the shifting mechanism 42 is now provided. The shifting mechanism 42 includes a gear wheel 60, a first pawl 62, a first biasing spring 64, a second pawl 66, a second biasing spring 68, a spacer 70 and a rotatable member 72.

The gear wheel 60 includes a first set of gear teeth 60a, a second set of gear teeth 60b and a pin 60c. The gear teeth 60a are smaller than the gear teeth 60b. With the cable-pull lever 38 installed to the housing 30 (see FIG. 5), the pivot shaft 58 on the cable-lever 38 extends into the recess 46. The first pawl 62 and the first biasing spring 64 are installed on the pivot shaft 58 such that the first pawl 62 is biased into engagement with the gear teeth 60a of the gear wheel 60. The first biasing spring 64 biases the first pawl 62 into engagement with the gear teeth 60a in a conventional manner. Consequently, pivoting movement of the cable-pull lever 38 causes the first pawl 62 to urge the gear wheel 60 to undergo rotational movement (causing a gear shift and corresponding movement of the chain C).

The second pawl 66, the second biasing spring 68 and the spacer 70 are installed on the secondary shaft 52. With the cable-release lever 40 installed on the secondary shaft 52, the extension 40a engages a portion of the second pawl 66 and the biasing spring 68 biases the second pawl 66 into engage the gear teeth 60b. Movement of the cable-release lever 40 causes the second pawl 66 to release one of the gear teeth 60b and urge the gear wheel 60 to undergo limited rotational movement (cause a gear shift).

A bracket 74 is installed over the upper end of both the main shaft 50 and the secondary shaft 52 to retain the rotatable member 72 and the cable-release lever 40 to the housing 30. The bracket 74 is removed in FIG. 8 to expose portions of the shifting mechanism 42.

It should be understood from the description and the drawings that any of a variety of configurations of the shifting mechanism 42 can be used with the gear indication portion 14 of the present invention. In other words, the gear indication portion 14 of the present invention can be included in shift control devices that include shifting mechanisms other than those portions of the shifting mechanism 42 described above.

With specific reference to FIGS. 6-9, a description of the rotatable member 72 is now provided. The rotatable member 72 is an annular member that is disposed in the recess 46 of the housing 30. The rotatable member 72 basically includes a central aperture 80, a cable attachment portion 82, a cable take-up portion 84, a pin aperture 86 (see FIGS. 6 and 8), a guide portion 88 and a slot 90.

The central aperture 80 is dimensioned to receive the main shaft 50. Specifically, the rotatable member 72 can rotate about the main shaft 50 within the recess 46. The bracket 74 retains the rotatable member 72 within the recess 46. The cable attachment portion 82 has a conventional shape to receive the end of an inner wire 92b of a Bowden-type cable 92a, as indicated in FIG. 8. The cable take-up portion 84 includes a lower outer periphery of the rotatable member 72. As the rotatable member 72 is rotated to shift gears, the inner wire 92b can at least partially wrap around the cable take-up portion 84.

The pin aperture 86 is configured to receive the pin 60c of the gear wheel 60. Hence, the gear wheel and the rotatable member 72 rotate together as a single body in response to gear shifting movement of either of the cable-pull lever 38 or the cable-release lever 40. Therefore, the rotatable member 72 is configured to rotate in response to movement of either of the cable-pull lever 38 or the cable-release lever 40 (one of the operating levers).

Figure 9:
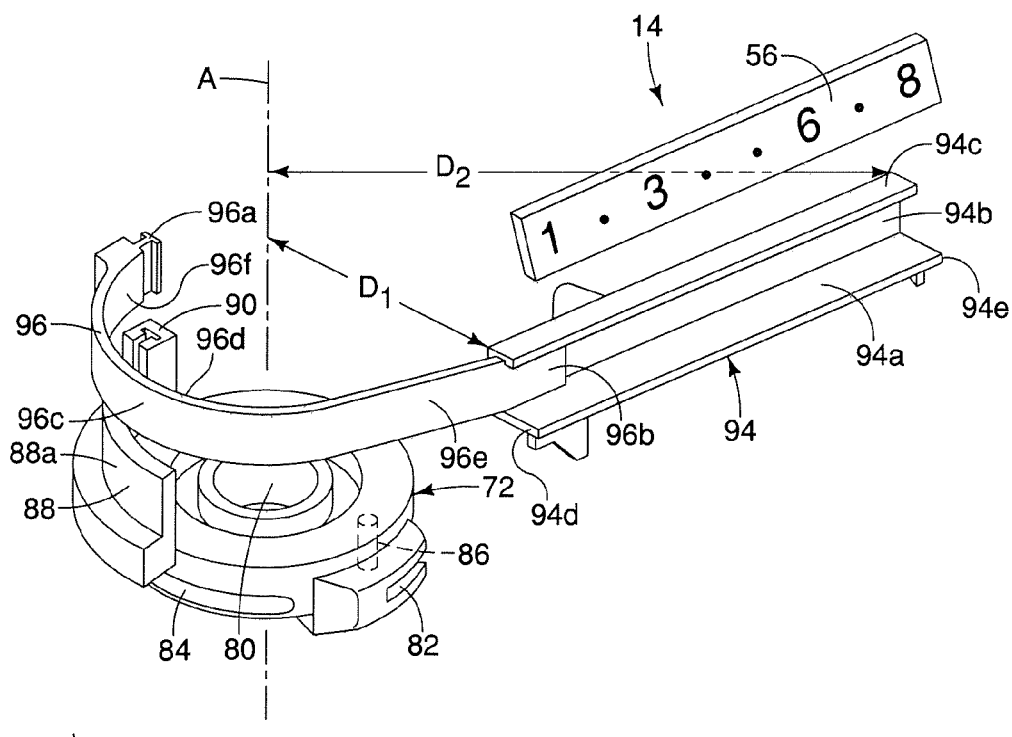
FIG. 9 is a perspective view of the gear indicator portion shown removed from the shift control device to provide greater clarity in accordance with the first embodiment of the present invention.
Figure 10:
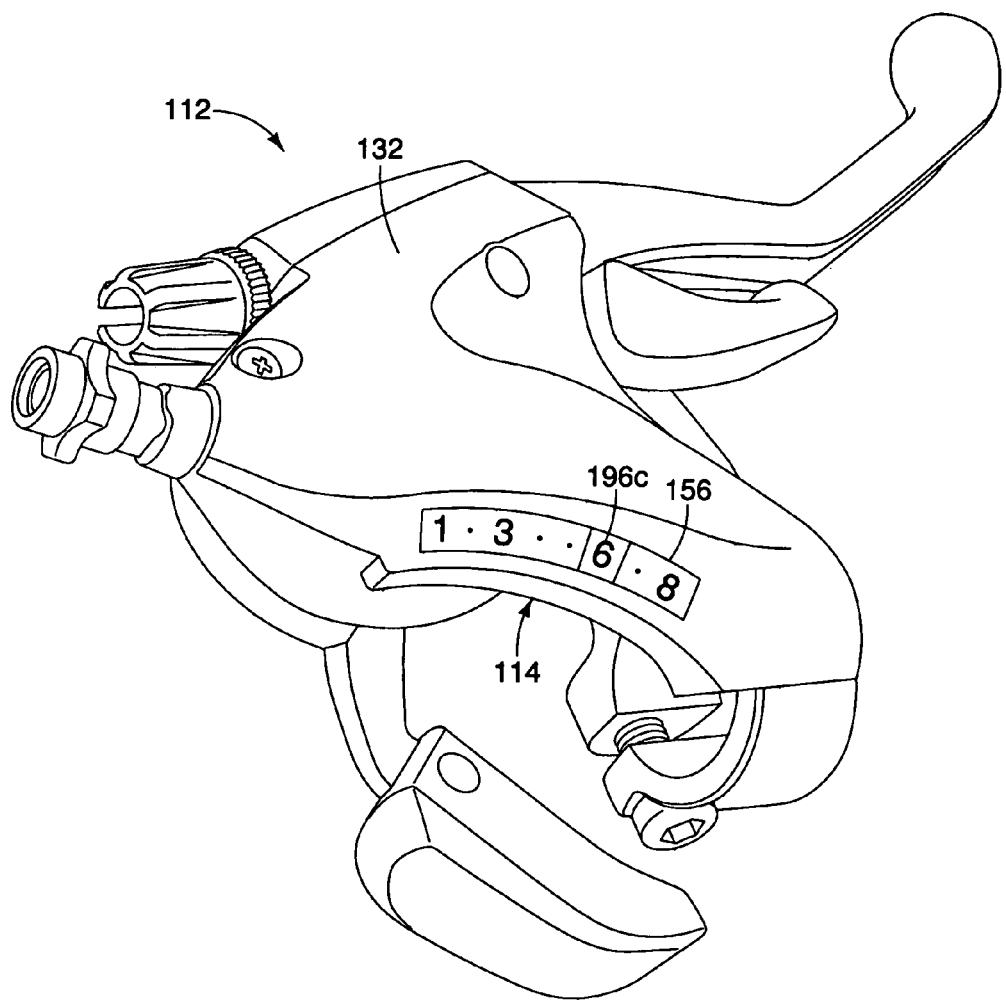
FIG. 10 is a perspective view of a shift control device having a gear indicator portion, shown removed from the bicycle in accordance with a second embodiment of the present invention.

As shown in FIG. 9, the guide portion 88 is an arcuately shaped guide wall that protrudes upwardly from the rotatable member 72 in a direction that is generally parallel to an axis of rotation A of the rotatable member 72. As shown in FIG. 7, the axis of rotation A is defined by the main shaft 50. The guide portion 88 has a generally arcuate surface 88a. As best shown in FIG. 8, the arcuate surface 88a is centered about the axis of rotation A. Further as shown in FIGS. 8 and 9, the arcuate surface 88a of the rotatable member 72 is parallel to the axis of rotation A. The slot 90 is a movement restricting portion of rotatable member 72.

As best shown in FIG. 9, the gear indicator portion 14 basically includes a track portion 94, a flexible elongated member 96 and the elongated lens 56. The gear indicator portion 14 further includes several features described above, such as the guide portion 88 and the slot 90 of the rotatable member 72.

The track portion 94 (a slider support portion) is configured and arranged to guide direction of movement of the flexible elongated member 96. The track portion 94 is generally straight (a generally linear orientation) and attaches to the housing 30 via a fastener $F_2$. It should be understood from the drawings and the description herein that the track portion 94 is configured to support and retain the elongated lens 56. For example, the elongated lens 56 can be molded with the track portion 94. Since the elongated lens 56 is preferably transparent, the elongated lens 56 and the track portion 94 are preferably made of differing materials. However, the elongated lens 56 is attached, fixed or otherwise bonded to the track portion 94 such that they are a single unit. Alternatively, the elongated lens 56 can be fitted to the upper cover 32. The elongated lens 56 is preferably provided with indicia, such as numbers representing the gear or gears of the bicycle 10 (i.e. the gear sprocket the chain C is moved to in response to shifting action of the shift control device 12).

Figure 4:
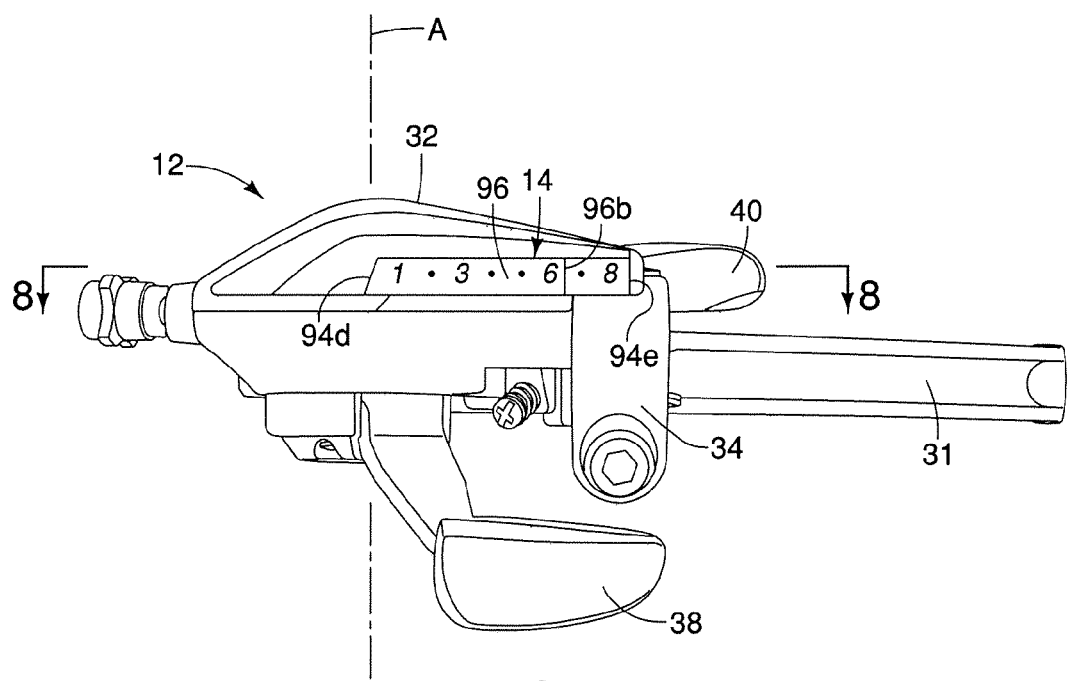
FIG. 4 is a side view of the shift control device showing the portion of the gear indicator portion in accordance with the first embodiment of the present invention.
Figure 5:
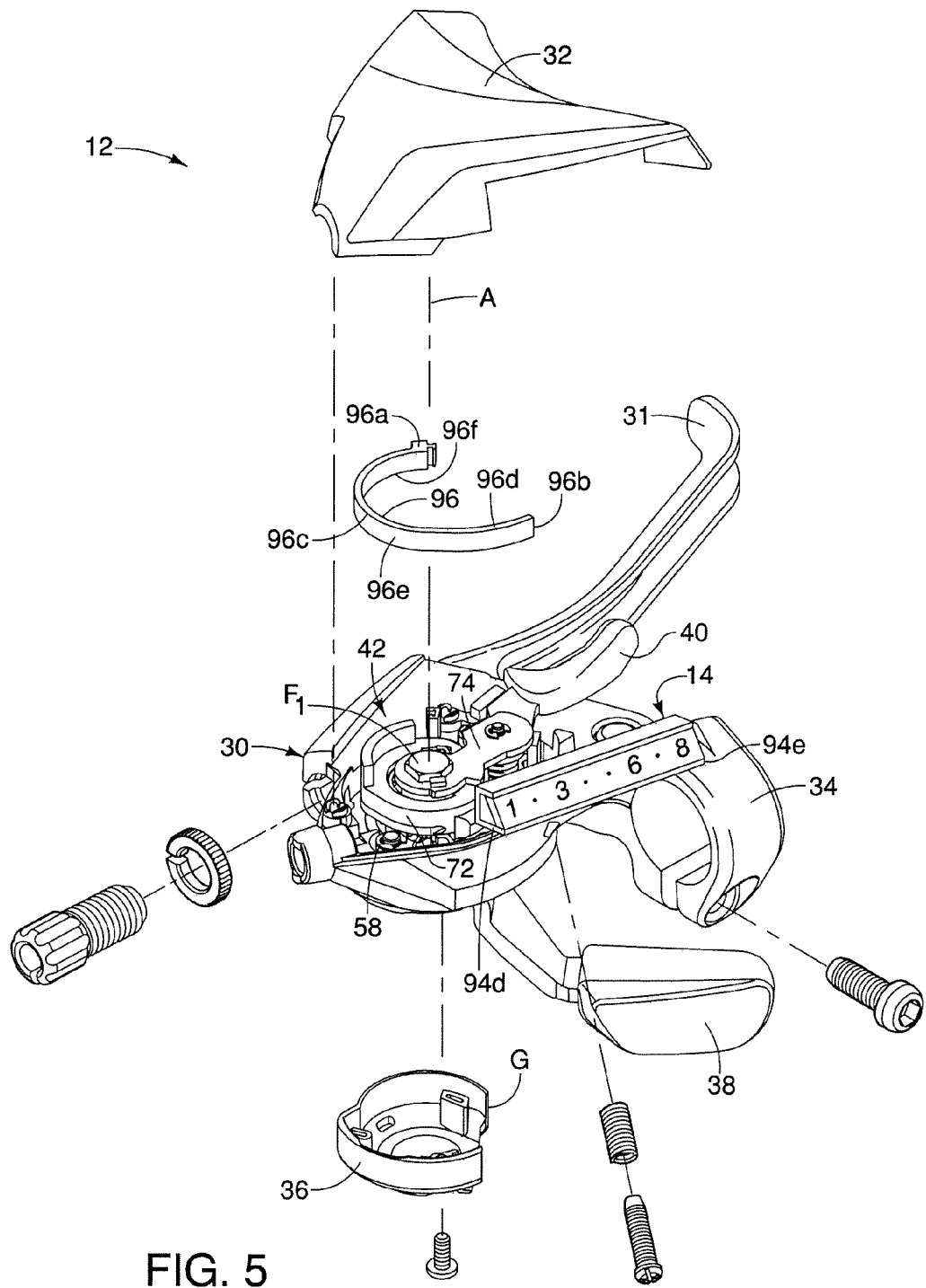
FIG. 5 is a partially exploded perspective view of the shift control device showing a housing, an upper cover, an cable-pull lever, a cable-release lever, portions of a shifting mechanism and components of the gear indicator portion in accordance with the first embodiment of the present invention.
Figure 6:
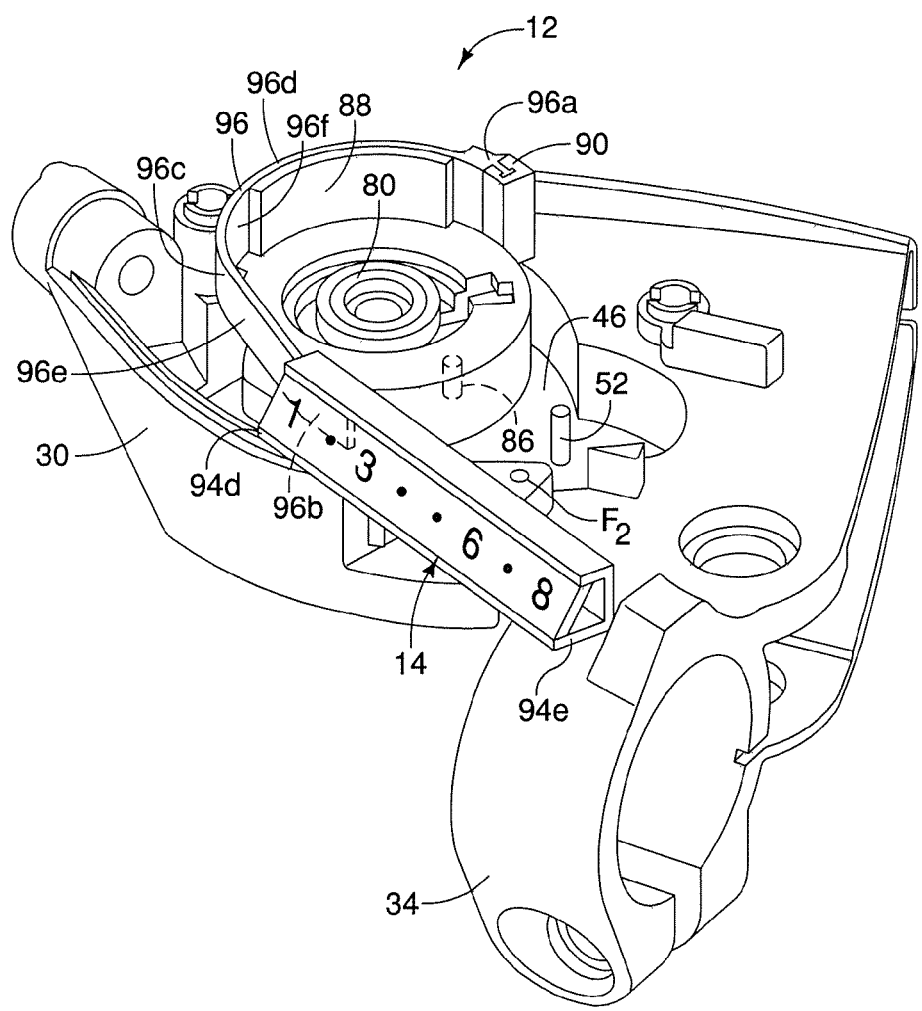
FIG. 6 is a perspective view of the housing of the shift control device with the upper cover, the cable-pull lever, the cable-release lever, and portions of the shifting mechanism removed showing the components of the gear indicator portion in accordance with the first embodiment of the present invention.

As best shown in FIGS. 6 and 9, the track portion 94 of the gear indicator portion 14 basically includes a lower wall 94a, a back wall 94b, an upper wall 94c, a first window end 94d and a second window end 94e. The lower wall 94a, the back wall 94b and upper wall 94c are all elongated. As is best shown in FIGS. 8 and 9, the first window end 94d is spaced apart from the axis of rotation A by a first distance $D_1$. The second window end 94e is spaced apart from the axis of rotation A by a second distance $D_2$, the second distance $D_2$ being greater than the first distance $D_1$. As shown in FIG. 4, the line 8-8 defines a plane corresponds to the cross-sectional view in FIG. 8. The plane defined by the line 8-8 is perpendicular to the axis rotation A. Further, the first window end 94d and the second window end 94e both coincide with the plane defined by the line 8-8, as shown in FIG. 4. A hollow interior or tube-like tunnel is defined between the elongated lens 56, the lower wall 94a, the back wall 94b and upper wall 94c such that in combination with the elongated lens 56, a portion of the flexible elongated member 96 is confined to move within the hollow interior of the track portion 94.

The flexible elongated member 96 (a slider) is made of a flexible material, such as plastic or similar polymer materials. The flexible elongated member 96 is preferably provided with a distinct color that renders is visible behind the elongated lens 56. The flexible elongated member 96 basically includes a first end portion 96a, a second end portion 96b and a main portion 96c, the main portion 96c extending from the first end portion 96a to the second end portion 96b. The main portion 96c has an edge surface 96d, a first elongated surface 96e and a second elongated surface 96f. The edge surface 96d, the first elongated surface 96e and the second elongated surface 96f all extend from the first end portion 96a to the second end portion 96b. The edge surface 96d is perpendicular to both the first elongated surface 96e and the second elongated surface 96e. A section of the second elongated surface 96f extends along and contacts the arcuate surface 88a of the guide portion 88, and a second section of the elongated surface 96e adjacent to the second end portion 96b of the flexible elongated member 96 extends into the gear indicator portion 14 as shown in FIGS. 6 and 8. In the first embodiment, the edge surface 96d is perpendicular to the first and second elongated surfaces 96e and 96f, and the axis of rotation A along an entire length of the flexible elongated member 96, as shown in FIGS. 5, 6, 8 and 9. The first end portion 96a includes a T-shaped protrusion (an enlarged portion) that conforms to the shape of the slot 90 in the rotatable member 72. Specifically, the first end 96a is inserted into the slot 90 and is therefore connected to the rotatable member 72 for movement therewith. A portion of the flexible elongated member 96 can contact the guide portion 88 of the rotatable member 72. Specifically, the flexible elongated member 96 extends at least part-way along the generally arcuate surface of the guide portion 88 of the rotatable member 72.

The second end portion 96b of the flexible elongated member 96 extends into the hollow interior of the track portion 94. Specifically, the second end portion 96b is configured for movement along the track portion 94 of the gear indicator portion 14 with at least a portion of the first elongated surface 96e and the second end portion 96b of the flexible elongated member 96 being visible through the elongated lens 56 (the window) of the gear indicator portion 14. Thus, as the rotatable member 72 is moved in response to movement of either the cable-pull lever 38 or the cable-release lever 40, the flexible elongated member 96 moves behind the indicia printed on the elongated lens 56. The position of the second end 96b therefore provides an indication of the selected gear.

Second Embodiment

Referring now to FIGS. 10-14, a shift control device 112 that includes a gear indicator portion 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The shift control device 112 includes a shift mechanism that is operably the same as the shift mechanism 42 in the first embodiment. Therefore description of the shift mechanism of the shift control device 112 is omitted for the sake of brevity.

The shift control device 112 includes a rotatable member 172 that has several features that differ from the rotatable member 72 of the first embodiment.

The shift control device 112 includes a housing 130 that includes many of the features of the housing 30 of the first embodiment, such as the recess 46, the main shaft 50 and the secondary shaft 52. However, the housing 130 includes a track portion 194 that is formed integrally into a portion of the housing 130. The track portion includes two walls 194a and 194b that define a recess or track 194c therebetween. The walls 194a and 194b and the track 194c include a serpentine shape along a portion thereof. Consequently, the track 194c (a track portion) is configured and arranged to guide direction of movement of a flexible elongated slider member 196 that is described herein below.

The shift control device 112 also includes an upper cover 132 that is similar in shape to the cover 32 of the first embodiment, but includes a curved or serpentine shaped lens 156 (a window) that includes indicia thereon.

Figure 11:
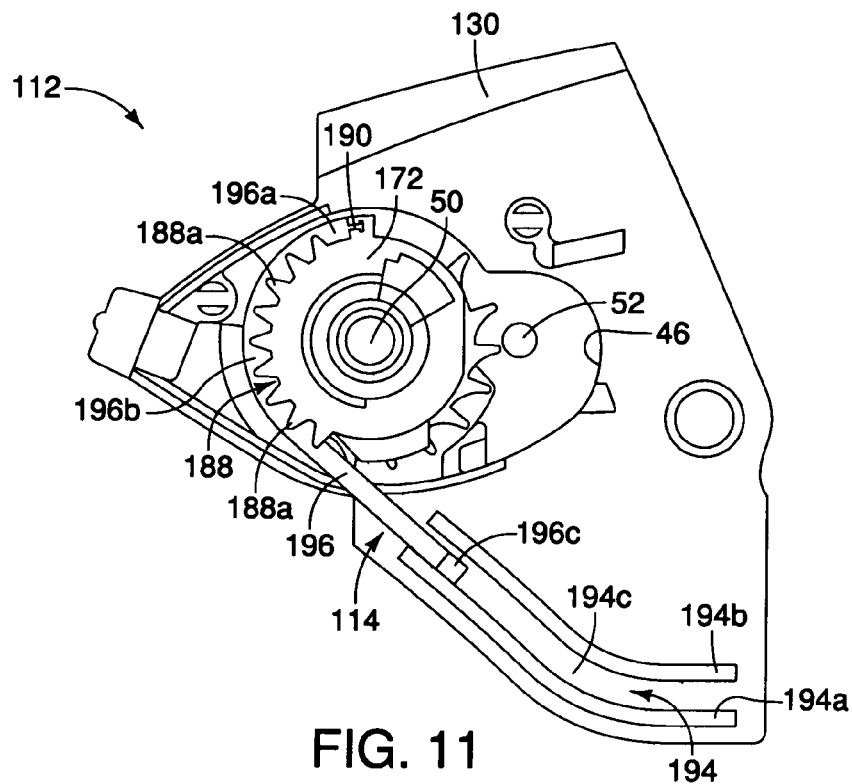
FIG. 11 is a top view of the shift control device showing features of the gear indicator portion with a gear indicator in a first orientation in accordance with the second embodiment of the present invention.
Figure 12:
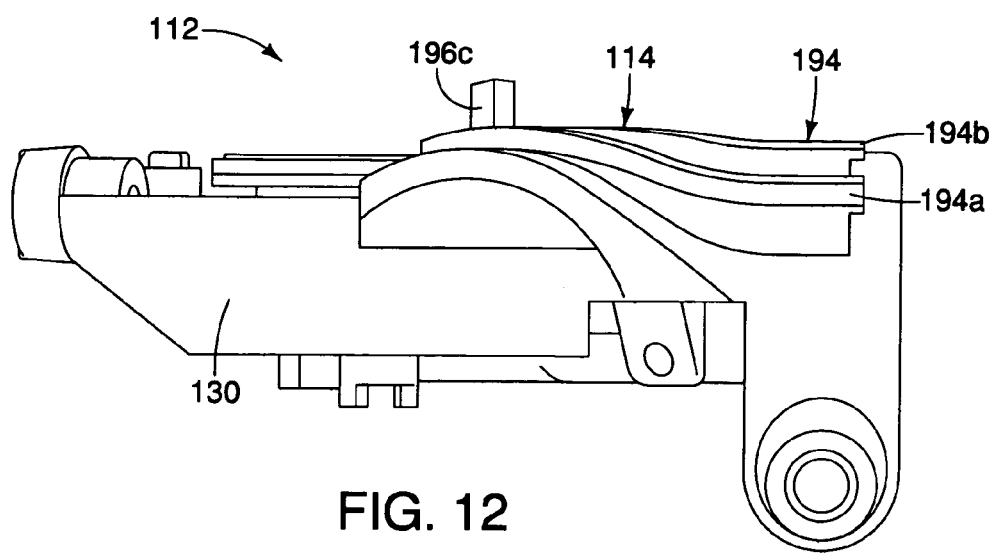
FIG. 12 is a side view of the shift control device showing features of the gear indicator portion with the gear indicator in the first orientation in accordance with the second embodiment of the present invention.
Figure 13:
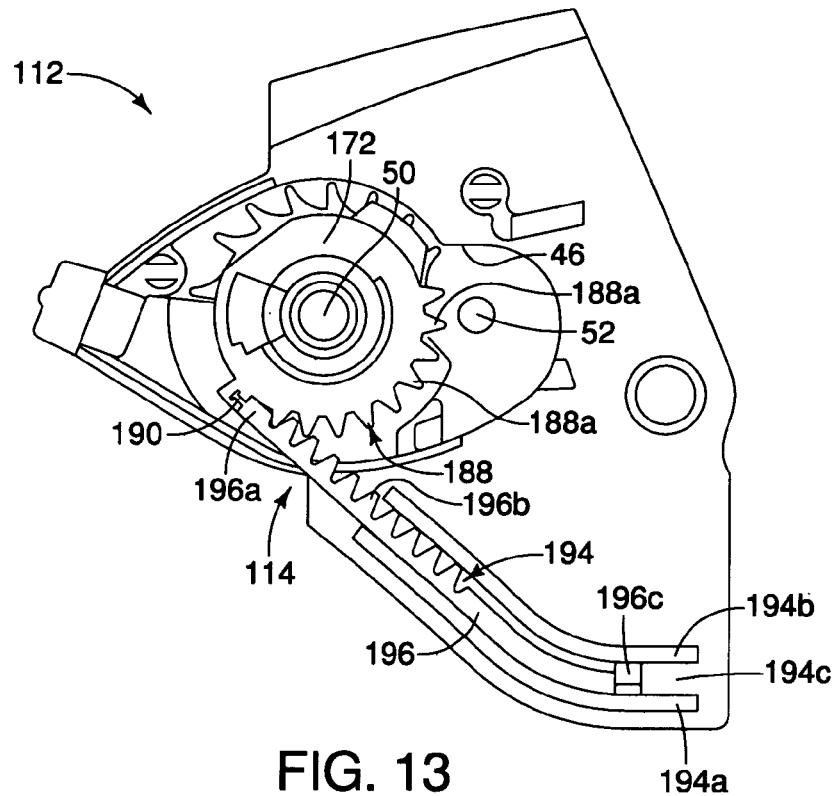
FIG. 13 is another top view of the shift control device showing features of the gear indicator portion with the gear indicator in a second orientation in accordance with the second embodiment of the present invention.
Figure 14:
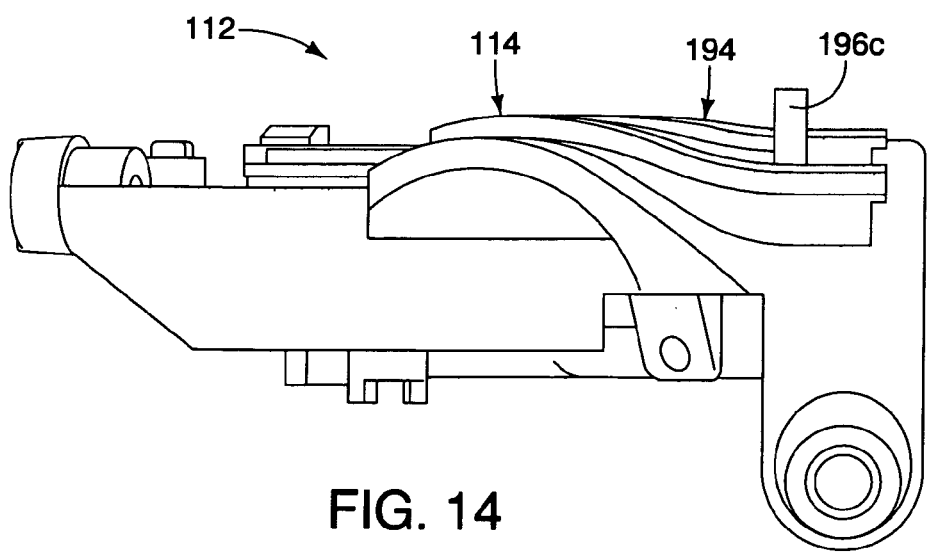
FIG. 14 is another side view of the shift control device showing features of the gear indicator portion with the gear indicator in the second orientation in accordance with the second embodiment of the present invention.

As shown in FIGS. 11 and 13, the rotatable member 172 includes a cable attachment portion (not shown) that is the same as the cable attachment portion 82 of the first embodiment, a guide portion 188 and a slot 190. The guide portion 188 includes a plurality of gear teeth 188a.

As also shown in FIGS. 11 and 13, the flexible elongated slider member 196 includes a first end portion 196a, a gear tooth portion 196b and a second end portion 196c. The first end portion 196a includes a T-shaped protrusion that is shaped to conform to the slot 190. The first end 196a is fitted into the slot 190 such that the flexible elongated slider member 196 is retained by the rotatable member 172 for rotational movement therewith. The gear tooth portion 196b engages at least a portion of the gear teeth 188a of the guide portion 188. Further, the second end portion 196c is disposed within the track 194c. Consequently, as the rotatable member 172 rotates, the second end portion 196c is moved along the track 194c behind the elongated lens 156 and the indicia on the elongated lens 156. The lens 156 is transparent and therefore the second end portion 196c is visible through the lens 156 providing an indication of the selected gear.

GENERAL INTERPRETATION OF TERMS

In understanding the scope of the present invention, the term "configured" as used herein to describe a component, section or part of a device includes hardware that is constructed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift control device comprising:
   a housing;
   at least one operating lever;
   a rotatable member disposed within the housing and configured to rotate about a rotation axis in response to movement of the at least one operating lever, the rotatable member having a guide portion;
   a flexible elongated member having a first end portion, a main portion and a second end portion, the main portion having an edge surface that extend from the first end portion to the second end portion; and
   a gear indicator portion having a window having a first window end and a second window end opposite the first window end, the first window end being positioned a first distance away from the rotation axis, the second window end being positioned a second distance away from the rotation axis greater than the first distance, with each of the first window end and the second window end coinciding with a plane perpendicular to the rotation axis;
   a first section of the edge surface being defined along that portion of the flexible elongated member extending from the first end portion to the gear indicator portion, the first section of the edge surface being perpendicular to the rotation axis,
   the first end portion being directly connected to the rotatable member for movement therewith and extending at least part-way along the guide portion of the rotatable member, and
   the second end portion being configured for movement along the gear indicator portion with at least a tip of the second end portion of the flexible elongated member being visible through the window of the gear indicator portion.

2. The bicycle shift control device as set forth in claim 1, wherein
   the rotatable member includes a cable take-up portion.

3. The bicycle shift control device as set forth in claim 1, wherein
   the window includes an elongated lens.

4. The bicycle shift control device as set forth in claim 1, wherein
   the first end portion of the flexible elongated member includes an enlarged section that is retained by a movement restricting portion of rotatable member.

5. The bicycle shift control device as set forth in claim 1, wherein
   the guide portion of the rotatable member includes an arcuately shaped guide wall, with the arcuate surface defined thereon.

6. The bicycle shift control device as set forth in claim 5, wherein
   the arcuate guide wall protrudes from the rotatable member in a direction parallel to an axis of rotation of the rotatable member.

7. The bicycle shift control device as set forth in claim 1, wherein
the window extends in a linear direction relative to the rotatable member.

8. The bicycle shift control device as set forth in claim 7, wherein
the window includes an elongated lens.

9. The bicycle shift control device as set forth in claim 1, wherein
the housing includes a track portion therein configured and arranged to guide direction of movement of the flexible elongated member.

10. The bicycle shift control device as set forth in claim 9, wherein
the track portion has a generally serpentine shape.

11. The bicycle shift control device as set forth in claim 1,
the gear indicator portion includes a track portion formed therein configured and arranged to guide direction of movement of the flexible elongated member.

12. The bicycle shift control device as set forth in claim 11, wherein
the gear indicator portion includes an elongated lens supported to the track portion.

13. The bicycle shift control device as set forth in claim 11, wherein
the track portion has a linear orientation.

14. The bicycle shift control device as set forth in claim 1, wherein
the guide portion of the rotatable member includes an arcuate surface, and
the main portion of the flexible elongated member further includes an elongated surface that extends from the first end portion to the second end portion, the edge surface and the elongated surface being perpendicular to one another, and a section of the elongated surface extends along and contacts the arcuate surface of the guide portion.

15. The bicycle shift control device as set forth in claim 14, wherein
a second section of the elongated surface adjacent to the second end portion of the flexible elongated member extends into the gear indicator portion.

16. The bicycle shift control device as set forth in claim 14, wherein
the arcuate surface of the guide portion of the rotatable member is centered about the rotation axis.

17. The bicycle shift control device as set forth in claim 14, wherein
the arcuate surface of the rotatable member is parallel to the rotation axis.

18. The bicycle shift control device as set forth in claim 1, wherein
the edge surface further being perpendicular to the elongated surface and the rotation axis along an entire length of the flexible elongated member.

* * * * *